United States Patent
Agiwal et al.

(10) Patent No.: US 11,064,545 B2
(45) Date of Patent: Jul. 13, 2021

(54) METHOD AND DEVICE FOR DEVICE TO DEVICE COMMUNICATION

(71) Applicant: Samsung Electronics Co., Ltd., Suwon-si (KR)

(72) Inventors: Anil Agiwal, Suwon-si (KR); June Hwang, Incheon (KR); Hyun-Seok Ryu, Yongin-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/686,489

(22) Filed: Nov. 18, 2019

(65) Prior Publication Data

US 2020/0084813 A1    Mar. 12, 2020

Related U.S. Application Data

(63) Continuation of application No. 15/505,912, filed as application No. PCT/KR2016/006216 on Jun. 10, 2016, now Pat. No. 10,485,038.

(30) Foreign Application Priority Data

Jun. 10, 2015  (IN) ............................ 645/KOL/2015
Sep. 23, 2015  (IN) ........................... 1007/KOL/2015

(51) Int. Cl.
*H04W 76/10* (2018.01)
*H04W 76/14* (2018.01)
(Continued)

(52) U.S. Cl.
CPC .......... *H04W 76/14* (2018.02); *H04W 8/005* (2013.01); *H04W 24/08* (2013.01); *H04W 76/10* (2018.02); *H04W 88/04* (2013.01)

(58) Field of Classification Search
CPC ..... H04W 76/14; H04W 76/10; H04W 8/005; H04W 24/08
See application file for complete search history.

(56) References Cited

U.S. PATENT DOCUMENTS

2006/0212538 A1   9/2006   Sutardja
2007/0071442 A1   3/2007   Lu
(Continued)

FOREIGN PATENT DOCUMENTS

WO   2015005693 A1   1/2015
WO   2015065107 A1   5/2015
(Continued)

OTHER PUBLICATIONS

LG Electronics Inc., "Radio resource provisioning for relay operation," R2-152772, May 21, 2015, 3GPP TSG-RAN WG2 #90, Fukuoka, Japan, May 25-29, 2015, 4 pages.

*Primary Examiner* — Ronald B Abelson

(57) ABSTRACT

The present disclosure relates to a 5G or pre-5G communication system for supporting a higher data transmission rate than a 4G communication system such as LTE. The method for device to device communication according to the present disclosure comprises: a step of receiving, by a terminal, search data from search resources for relay search within a specified search-receiving resource pool, and decoding the same; a step of measuring, by the terminal, link qualities of the search resources which deliver demodulation reference signals, from the search resources corresponding to successfully decoded search data; and a step of filtering a link quality corresponding to an identifier of a specific relay among the measured link qualities.

18 Claims, 13 Drawing Sheets

(51) Int. Cl.
*H04W 24/08* (2009.01)
*H04W 8/00* (2009.01)
*H04W 88/04* (2009.01)

(56) References Cited

U.S. PATENT DOCUMENTS

| | | |
|---|---|---|
| 2007/0072554 A1 | 3/2007 | Janky |
| 2012/0196593 A1 | 8/2012 | Jung et al. |
| 2014/0269610 A1 | 9/2014 | Hiben et al. |
| 2015/0173003 A1 | 6/2015 | Li et al. |
| 2015/0334555 A1 | 11/2015 | Seo et al. |
| 2016/0249198 A1 | 8/2016 | Kim et al. |
| 2016/0278150 A1 | 9/2016 | Jung et al. |
| 2016/0302250 A1* | 10/2016 | Sheng ................ H04W 76/023 |
| 2016/0330780 A1 | 11/2016 | Kim et al. |
| 2016/0338094 A1 | 11/2016 | Faurie et al. |

FOREIGN PATENT DOCUMENTS

| | | |
|---|---|---|
| WO | 2015065109 A1 | 5/2015 |
| WO | 2015065112 A1 | 5/2015 |
| WO | 2015065130 A1 | 5/2015 |
| WO | 2015160158 A1 | 10/2015 |
| WO | 2016036182 A1 | 3/2016 |
| WO | 2016167635 A1 | 10/2016 |

\* cited by examiner

METHOD AND DEVICE FOR DEVICE TO DEVICE COMMUNICATION

CROSS-REFERENCE TO RELATED APPLICATIONS

This application is a continuation of application Ser. No. 15/505,912, which is the National Stage of International Application No. PCT/KR2016/006216, filed Jun. 10, 2016, which claim priority to Indian Application No. 645/KOL/2015, filed Jun. 10, 2015, and Indian Application No. 1007/KOL/2015, filed Sep. 23, 2015, each of which are incorporated herein by reference into the present disclosure as if fully set forth herein.

BACKGROUND

1. Field

The present disclosure relates to a method and an apparatus for searching for and discovering a relay in a communication system supporting device to device direct communication.

2. Description of Related Art

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), an array antenna, analog beam-forming, and a large scale antenna are discussed to mitigate a propagation path loss in the mmWave band and increase a propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (COMP), and interference cancellation have been developed to improve the system network in the 5G communication system.

In addition, the 5G system has developed Advanced. Coding Modulation (ACM) schemes such as Hybrid FSK and CLAM Modulation (FOAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA)

Meanwhile, due to the recent emergence of the Internet of Things, interest in a D2D communication technology which is one of the communication methods for interworking with a smart device has increased. The D2D communication technology operates based on physical proximity between User Equipments (UEs) and has many advantages in terms of an increase in efficiency of network resources, a decrease in UE power consumption, and an expansion of a cellular communication area. In order to reflect such a situation, a D2D technology was selected as a study item, and feasibility research of a Proximity-based Service (ProSe) was started in Release 12 through 3GPP in 2011 and earnest standardization work was started in 2013.

A D2D UE, which is a transmitter, may transmit data packets to a UE group including intended D2D UEs or broadcast data packets to all D2D UEs during communication. D2D communication between the transmitter and receiver(s) essentially corresponds to a non-connection. That is, before the transmitter starts transmission of data packets, there is no connection configuration between the transmitter and the receiver. Further, when transmitting data packets, the transmitter inserts a source ID and a destination ID into the data packets. The source ID is set as a UE ID of the transmitter. The destination ID corresponds to a broadcast ID or a group ID of the receiver to receive the transmitted packet.

One of the D2D communication requirements is to make an out-of-coverage remote UE communication with a network through another UE that is within the network coverage and is close to the remote UE. As described above, a UE that serves as a relay is referred to as a "relay UE".

FIG. 1 illustrates an example in which a remote UE communicates with a relay UE through D2D communication.

Referring to FIG. 1, a remote UE 101 may communicate with a network through a UE-to-Network relay 102 (hereinafter, referred to as a relay UE) and corresponds to a UE which desires to communicate with the network through the relay UE and is within the network coverage. D2D communication 104 is performed between the remote UE 101 and the relay UE 102, and cellular communication 105 is performed between the relay UE 102 and an eNB 103.

A D2D direct discovery process is used for discovering the relay LTE, In order to make the remote UE 101 discover the relay UE 102, the relay UE 102 may periodically transmit (or announce) discovery information (for example, a UE ID and a notification indicating that the UE ID corresponds to the relay UE) through a relay discovery announcement message and, accordingly, the remote UE may use the relay discovery announcement message to search for/discover a nearby relay UE. The remote UE monitors discovery resources or a physical channel for discovery information transmitted by neighboring UEs to discover the nearby relay UE.

in communication between devices used by the relay UE to expand the coverage, the remote UE may find a plurality of UEs to act as a relay between the network and the remote UE, and should select a best UE of the found UEs as the relay UE. Further, even when the remote UE re-selects another relay UE, the same operations are performed during communication with the relay UE. In the relay UE selection and re-selection, the most important information for the selection is link quality for a link (that is, a D2D link) between the remote UE and relay UE candidates.

There are two methods to measure the D2D link quality. In the first method, the D2D link quality is measured using reference signals (RSs) transmitted to physical resource blocks (PRBs) of a physical sidelink broadcast channel (PSBCH). In the second method, the D2D link quality is measured using reference signals transmitted to PRBs of a physical sidelink discovery channel (PSDCH).

SUMMARY

In the first method, since PSBCHs transmitted by the relay UE candidates are all the same, link quality between the remote UE and each of the relay UE candidates should be identified and measured to select the relay UE. Accordingly, such a method cannot be used for measuring the D2D link quality. Further, a protocol stack for transmission/reception of a discovery message in a currentsystem includes a radio resource control (RRC) layer, a physical (PHY) layer, a media access control (MAC) layer, and a proximity service (ProSe) protocol. To measure the link quality, the radio resource control (RRC) layer configures measurement for the physical (PHY) layer, and the PHY layer performs the measurement and provides a result of the measurement to the RRC layer. However, in the measurement of the D2D link quality, an ID of the relay HE is not known to the P layer. This is because, the discovery message penetrates the PHY layer. Further, unique discovery resources for a particular relay UE are also not known. Accordingly, to discover the D2D link, the remote UE should monitor all the configured discovery resources and the PHY layer cannot measure the particular relay UE and cannot provide a measurement value to the RRC layer. Therefore, the second method is also not suitable for the D2D link quality.

Accordingly, the present disclosure provides a method of measuring a particular relay UE and determining the measurement, and an apparatus for the same.

According to an embodiment of the present disclosure, a method of device to device direct communication includes: receiving and decoding discovery data in discovery resources for discovering a relay within a predetermined discovery reception resource pool by a UE; measuring link qualities for discovery resources carrying demodulation reference signals in discovery resources corresponding to successfully decoded discovery data by the UE; and filtering a link quality corresponding to an ID of a predetermined relay among the measured link qualities.

According to another embodiment of the present disclosure, a UE apparatus for device to device direct communication includes: a transceiver that performs cellular communication with a BS and performs device to device direction communication with a counterpart UE through a direct communication path; and a controller that receives and decodes discovery data in discovery resources for discovering a relay within a predetermined discovery reception resource pool, measures link qualities for discovery resources carrying demodulation reference signals in discovery resources corresponding to successfully decoded discovery data, and filters a link quality corresponding to an ID of a predetermined relay among the measured link qualities.

DETAILED DESCRIPTION

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the terms should be defined on the basis of the contents throughout the specification.

In the detailed description of the present disclosure, an example of interpretable meanings of some terms used in the present disclosure is proposed. However, it is noted that the terms are not limited to the examples of the construable meanings which are proposed below.

A base station is a subject communicating with a User Equipment (UE), and may be referred to as a BS, a Node B (NB), an eNode B (eNB), an Access Point (AP) or the like. The user equipment is a subject communicating with the BS, and may be referred to as a UE, a Mobile Station (MS), a Mobile Equipment (ME), a device, a terminal or the like Hereinafter, D2D link quality measuring methods for different UEs according to an embodiment of the present disclosure will be described with reference to the drawings. The link quality measuring methods described below may be performed by the remote UE and/or the relay UE.

Figure 1:
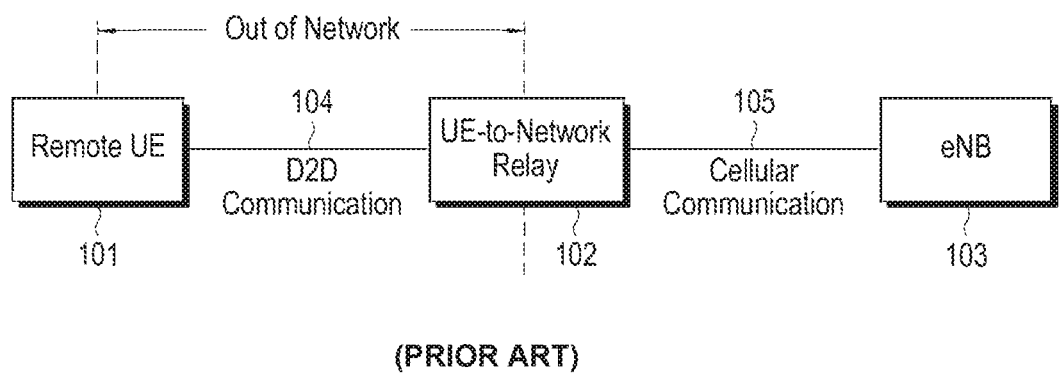
FIG. 1 illustrates an example in which a remote UE communicates with a relay UE through D2D communication.
Figure 2:
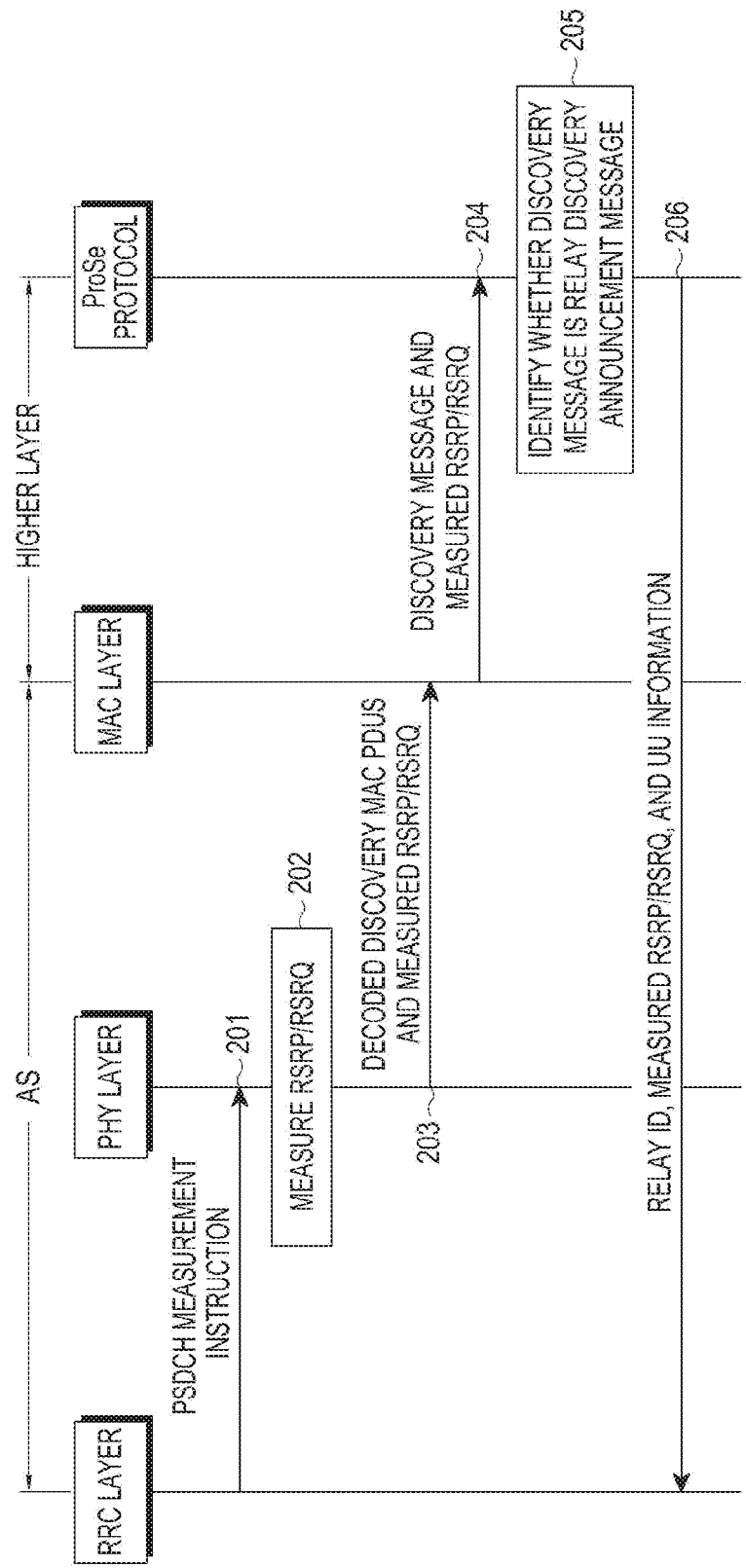
FIGS. 2 and 3 illustrate a D2D link quality measurement method for a relay according to a first embodiment of the present disclosure.

FIG. 2 illustrates D2D link quality measuring methods for different UEs according to a first embodiment of the present disclosure.

Referring to FIG. 2, a layer measures link quality on each discovery resource (or PRBs) or discovery resources (or PRBs) by which discovery protocol data units (PDUs) are successfully received (that is, successfully decoded or passing through a cyclic redundancy check (CRC)), that is, reference signal received power (RSRP), reference signal received quality (RSRQ), or received signal strength indicator (RSSI) according to an instruction 201 of an RRC layer in step 202. At this time, measurement values for PRBs on which the successfully received discovery PDUs are repeated are measured. In each of the successfully received discovery PDUs, measurement values corresponding to all transmissions for the discovery PDUs including the repetition are combined (averaged) into one or each of the measurement values is associated with the corresponding discovery PDU. The measurement may be performed on demodulation reference signals (DMRSs) transmitted through discovery PRBs.

Discovery resources measured by the PHY layer may be one of the following discovery resources.

First, discovery resources within all discovery reception (RX) resource pools

Second, discovery resources within all public safety (PS) discovery RX resource pools Third, discovery resources within all relay UE discovery RX resource pools Further, the PHY layer decodes discovery PHY PDUs through the discovery resources. The PHY layer transmits a measurement result for the discovery resources of the discovery PHY PDUs having been successfully decoded (having passed through the CRC) to a MAC layer in step 203. At this time, measurement values for PRBs on which the successfully received discovery PDUs are repeated are measured. In each of the successfully received discovery PDUs, measurement values corresponding to all transmissions for the discovery PDUs including the repetition are combined (averaged) into one, or each of the measurement values is combined with the corresponding discovery PDU and transmitted to the MAC layer. The measurement result is transmitted along with decoded discovery MAC PDUs (PHY PDUs having not passed through the CRC).

The MAC layer transmits the discovery message and the measurement result received from the PHY layer to a ProSe protocol in step 204. At this time, according to an embodiment, the measurement result may not be directly transmitted to the ProSe protocol. In this case, a measured discovery MAC PDU list may be stored in an access stratum (AS) (MAC or RRC) layer, and an order of the measured list may be the same as an order of the transmitted discovery message. Further, each discovery message transmitted to the ProSe protocol may be indexed within the AS layer. According to another embodiment, among the discovery messages, only a discovery message having a signal strength higher than a set (or preset) threshold may be transmitted to the ProSe protocol.

The ProSe protocol determines whether the discovery message is a relay UE discovery message (an announcement, request, or response message) based on fields within the received discovery message in step 205. When the discovery message is the relay UE discovery message, the ProSe protocol transmits a relay ID and the measurement result received through the discovery message to the RRC layer in step 206. When the discovery message is not the relay UE discovery message, the ProSe protocol does not transmit the corresponding message to the RRC layer. When transmitting the relay ID and the measurement result to the RRC layer, the ProSe protocol may also transmit other measurement-related information received through the discovery message to the RRC layer. Further, according to an embodiment, the ProSe protocol may identify whether the UE having performed the measurement is interested in the corresponding relay based on higher layer parameters. The ProSe protocol ay transmit the relay ID and the measurement result received through the discovery message to the RRC layer only when the UE is interested in the corresponding relay, and, otherwise, does not transmit them.

Figure 3:
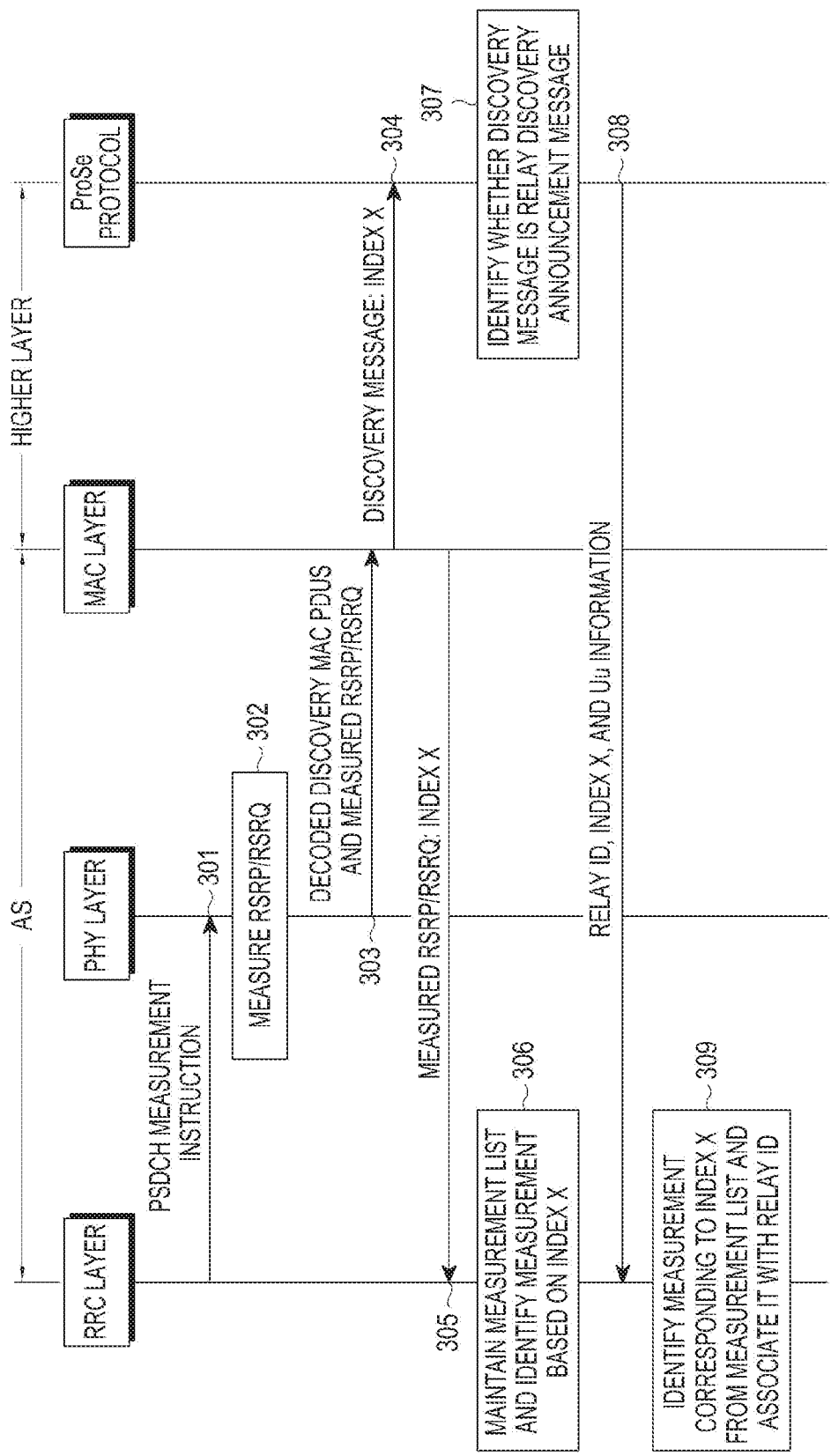

FIG. 3 illustrates an embodiment of not transmitting the measurement result to the ProSe protocol in the method of measuring the D2D link qualities for different UE according to the first embodiment of the present disclosure.

Referring to FIG. 3, steps 301 to 303 are the same as steps 201 to 203 of FIG. 2. The MAC layer having received the decoded discovery MAC PDUs and the measurement result from the PHY layer transmits the discovery message to the ProSe protocol and, at this time, also transmits an index of the discovery message instead of the measurement result in step 304. Further, the MAC layer transmits the measurement result and the index to the RRC layer in step 305. The RRC layer may maintain the measurement list and identify each discovery message or the measurement of the relay UE corresponding to the discovery message based on the received index in step 306.

Meanwhile, the ProSe protocol determines whether the discovery message received from the MAC layer is a relay UE discovery message (an announcement, request, or response message) based on fields within the received discovery message in step 307. When the discovery message is the relay UE discovery message, the ProSe protocol transmits the relay ID and the index received through the discovery message to the RRC layer in step 308. When the discovery message is not the relay UE discovery message, the ProSe protocol does not transmit the corresponding message to the RRC layer. For example, when 5 messages are transmitted to the ProSe protocol the messages have numbers from 1 to 5. Measurement values within the measurement list corresponding to the message also have numbers from 1 to 5. Accordingly, when the relay identified by the ProSe protocol corresponds to message 5, the ProSe protocol transmits index 5 to the RRC layer.

The RRC layer may identify the measurement value from the measurement list maintained within the RRC layer based on the index received from the ProSe protocol. Further, the RRC layer uses information received from the ProSe protocol to select/re-select a relay. That is, in order to avoid a sudden wireless change of relay UEs in a final candidate list, a moving average, that is, signal strength filtering is performed. Then, the relay UEs in the final candidate list are ranked in a descending order of a signal strength and a best relay UE (having the highest signal strength) is selected. According to an embodiment, the ranking may be performed only when two or more relay UEs exist. According to an embodiment, the ranking may be performed only for relay UEs having the signal strength higher than a threshold value.

According to an embodiment, the ProSe protocol may select/re-select a relay UE by using the measurement result without transmitting the measurement result to the RRC layer. That is, in order to avoid a sudden wireless change of relay UEs in the final candidate list, the moving average, that is, signal strength filtering is performed. Then, the relay UEs in the final candidate list are ranked in a descending order of a signal strength and a best relay UE (having the highest signal strength) is selected. According to an embodiment, the ranking may be performed only when two or more relay UEs exist. Further, according to an embodiment, the ranking may be performed only for relay UEs having the signal strength higher than a threshold value. In addition, according to an embodiment, the ProSe Protocol may select/re-select the relay UE by transmitting the measurement result to the MAC layer. Moreover, according to an embodiment, the measurement instruction may be transmitted to the PHY layer instead of the RRC layer by a higher layer (the ProSe protocol or the MAC layer)

Figure 4:
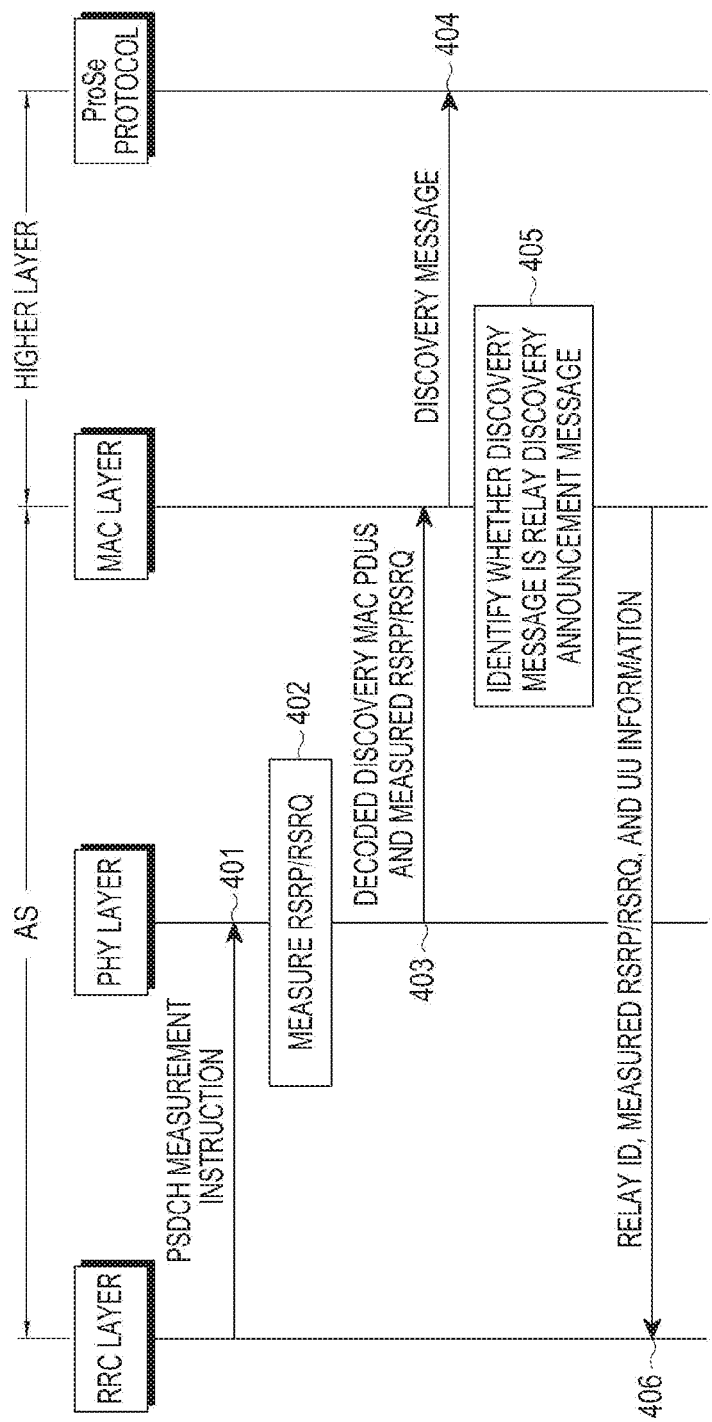
FIG. 4 illustrates a D2D link quality measurement method for a relay according to a second embodiment of the present disclosure.

FIG. 4 illustrates a method of measuring D2D link qualities for different UEs according to a second embodiment of the present disclosure.

Referring to FIG. 4, a layer measures link quality on each discovery resource (or PRBs) or discovery resources (or PRBs) by which discovery protocol data units (PDUs) are successfully received (that is, successfully decoded or passing through a cyclic redundancy check (CRC)), that is, reference signal received power (RSRP), reference signal received quality (RSRQ), or received signal strength indicator (RSSI) according to an instruction 401 of an RRC layer in step 402. At this time, measurement values for PRBs on which the successfully received discovery PDUs are repeated are measured. In each of the successfully received discovery PDUs, measurement values corresponding to all transmissions for the discovery PDUs including the repetition are combined (averaged) into one, or each of the measurement values is associated with the corresponding discovery PDU. The measurement may be performed on demodulation reference signals (DMRSs) transmitted through discovery PRBs.

Discovery resources measured by the PHY layer may be one of the following discovery resources.

First, discovery resources within all discovery reception (RX) resource pool

Second, discovery resources within all public safety (PS) discovery RX resource pools Third, discovery resources within all relay UE discovery RX resource pools Further, the PHY layer decodes discovery PHY PDUs through the discovery resources. The PHY layer transmits a measurement result for the discovery resources of the discovery PHY PDUs having been successfully decoded (having passed through the CRC) to a MAC layer in step 403. At this time, measurement values for PRBs on which the successfully received discovery PDUs are repeated are measured. In each of the successfully received discovery PDUs, measurement values corresponding to all transmissions for the discovery PDUs including the repetition are combined (averaged) into one, or each of the measurement values is combined with the corresponding discovery PDU and transmitted to the MAC layer. The measurement result is transmitted along with decoded discovery MAC PDUs (PHY PDUs having not passed through the CRC).

The MAC layer transmits the discovery message received from the PHY layer to a ProSe protocol in step 404.

Further, based on fields within the discovery message received from the PHY layer, the MAC layer determines whether the discovery message is a relay UE discovery message (an announcement, request, or response message) in step 405. When the discovery message is the relay UE discovery message, the MAC layer transmits a relay ID and the measurement result received through the discovery message to the RRC layer in step 406. When the discovery message is not the relay UE discovery message, the MAC layer ignores the corresponding message without transmitting the corresponding message to the RRC layer.

According to an embodiment, the discovery message may be a discovery message related to the measurement, which is transmitted by the relay UE. When receiving the discovery MAC MU, the MAC layer checks whether there is the discovery message. When the discovery message exists in the discovery MAC PDU, the MAC layer informs the RRC layer of the measurement result and other information received through the discovery message. When the discovery message does not exist in the discovery MAC MU, the MAC layer transmits the discovery message to the ProSe protocol. The RRC layer uses information received from the MAC layer to select/re-select a relay. That is, in order to avoid a sudden wireless change of relay UEs in a final candidate list, a moving average, that is, signal strength filtering is performed. Then, the relay UEs in the final candidate list are ranked in a descending order of a signal strength and a best relay UE (having the highest signal strength) is selected. According to an embodiment, the ranking may be performed only when two or more relay UEs exist. Further, according to an embodiment, the ranking may be performed only for relay UEs having the signal strength higher than a threshold value.

According to another embodiment, the MAC layer may select/re-select a relay UE by using the measurement result without transmitting the measurement result to the RRC layer. That is, in order to avoid a sudden wireless change of relay UEs in a final candidate list, a moving average, that is, signal strength filtering is performed. Then, the relay UEs in the final candidate list are ranked in a descending order of a signal strength and a best relay UE (having the highest signal strength) is selected. According to an embodiment, the ranking may be performed only when two or more relay UEs exist. Further, according to an embodiment, the ranking may be performed only for relay UEs having the signal strength higher than a threshold value.

Further, according to an embodiment, the measurement instruction may be transmitted to the PHY layer instead of the RRC layer by a higher layer (the ProSe protocol or the MAC layer)

In addition, according to the second embodiment of the present disclosure, a protocol stack for transmission of the discovery message may be changed.

Figure 5:
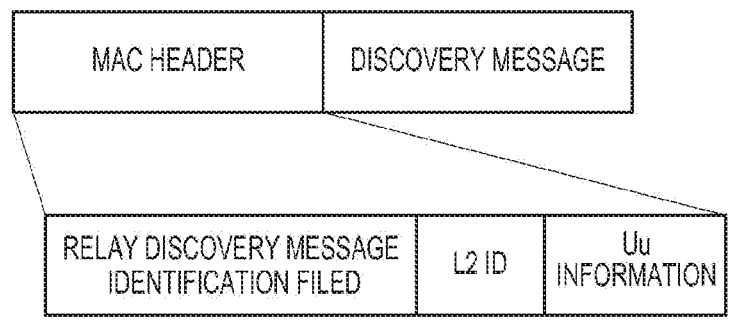
FIG. 5 illustrates a configuration of a discovery MAC PDU according to an embodiment of the present disclosure.

According to an embodiment, the MAC layer may be non-permeable and, accordingly, fields related to the relay UE measurement are added to a MAC header. This is illustrated in FIG. 5.

According to another embodiment, the PHY may be non-permeable and, accordingly, an L2ID is added to a CRC mask or a PHY header. The identification of the relay UE discovery message is based on each resource pool for the relay, or the ID is included in a CRC mask or a PHY header.

According to another embodiment, both the PHY and the MAC may be non-permeable accordingly, some information may be included in the MAC and some information may be included in the PHY.

According to another embodiment, the protocol stack for discovery message transmission is not changed, but the MAC layer of the receiver may acquire L2ID and/or other measurement-related information by analyzing some fields of the discovery message.

Figure 6:
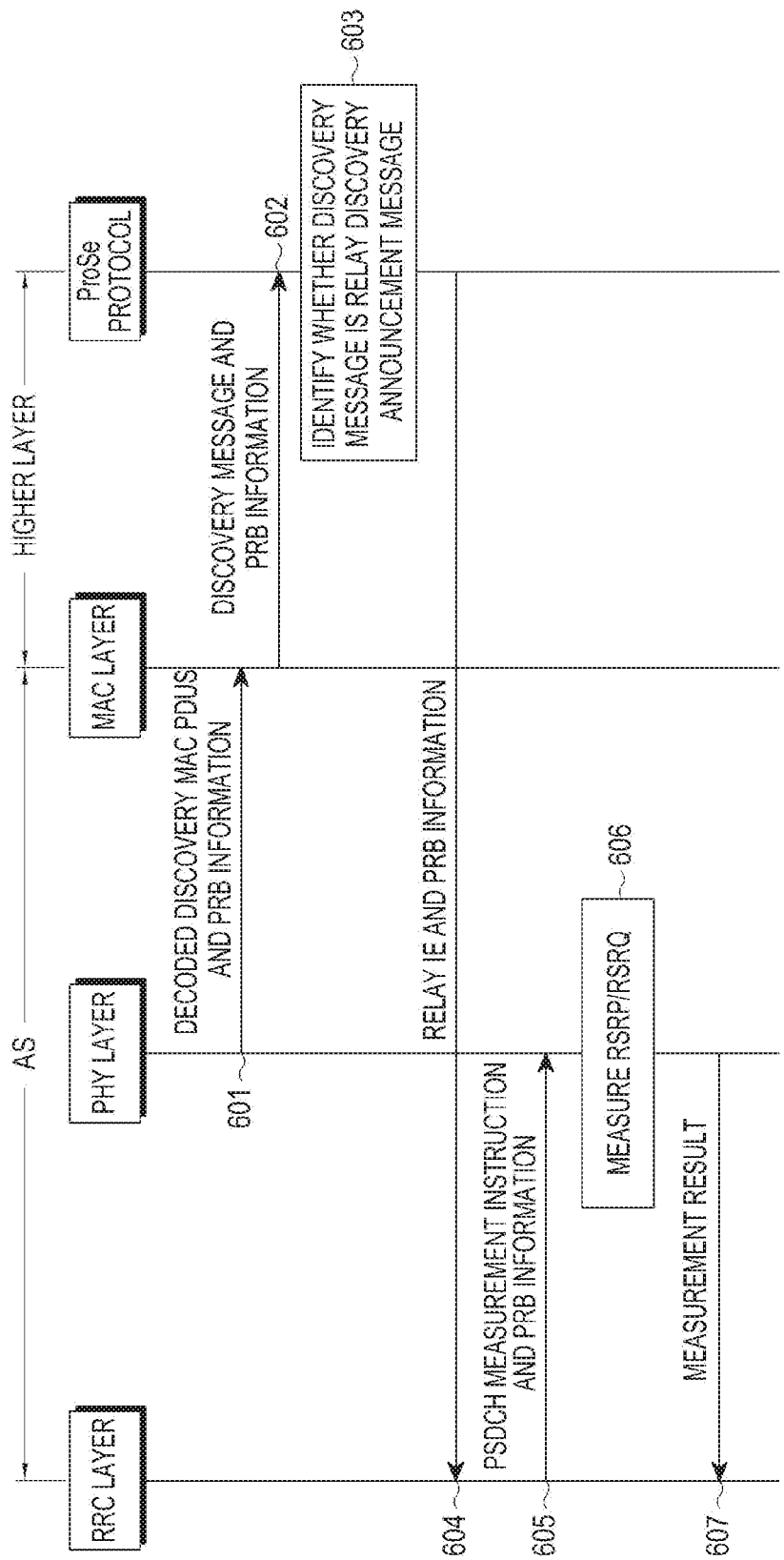
FIG. 6 illustrates a method of measuring D2D link qualities for different UEs according to a third embodiment of the present disclosure.

FIG. 6 illustrates a method of measuring D2D link qualities for different UEs according to a third embodiment of the present disclosure.

Referring to FIG. 6, a PHY layer decodes discovery PHY PDUs through discovery resources and transmits discovery resource information to a MAC layer along with the decoded discovery MAC PDUs (PHY PDUs without CRC) in step 601.

The PHY layer transmits information on the discovery resources on which the discovery PDUs have been successfully decoded for one of the following discovery resources to the MAC layer.

First, discovery PHY PDUs received on discovery resources within all discovery RX resource pools Second, discovery PHY PDUs received on discovery resources within all PS discovery RX resource pools Third, discovery PHY PDUs received on discovery resources within all relay UE discovery RX resource pools The MAC layer transmits the discovery message and the discovery resource information received from the PHY layer to a ProSe protocol in step 602.

Based on fields within the discovery message received from the MAC layer, the ProSe protocol determines whether the received discovery message is a relay UE discovery message (an announcement, request, or response message) in step 603. The ProSe protocol transmits a relay ID and discovery resource information received through the discovery message to the RRC layer in step 604 when the discovery message is the relay UE discovery message, and ignores the discovery information when the discovery message is not the relay UE discovery message. At this time, other measurement-related information received through the discovery message is also transmitted to the RRC layer. Further, the ProSe protocol may identify whether the UE is interested in the corresponding relay based on higher layer parameters. The ProSe protocol may transmit the relay ID and the discovery resource information received through the discovery message to the RRC layer only when the UE is interested in the corresponding relay, and, otherwise, may ignore the relay ID and the discovery resource information without transmitting them.

The RRC layer instructs the PHY layer to measure the PSDCH in step 605. At this time, the RRC layer provides the discovery resource information received from the ProSe protocol to the PHY layer.

The PHY layer performs the measurement based on the discovery resource information received from the RRC layer in step 606, and provides a result of the measurement to the RRC layer or the MAC layer in step 607. When the PHY layer provides the result of the measurement to the MAC layer, the MAC layer may transmit the result of the measurement to the RRC layer or select/re-select the relay based on the result of the measurement. In a method of measuring the discovery resource information by the PHY layer, the PHY may measure the discovery resource information (that is, PRBs) instructed by the RRC layer at every discovery period or determine PRBs within the next discovery period based on a predetermined pattern and measure the determined PRBs. At this time, the PRBs instructed by the RRC may be for the previous period.

According to an embodiment, the ProSe protocol may transmit the relay UE ID and the discovery resource information received through the discovery message to the MAC layer. Then, the MAC layer instructs the PHY layer to perform measurement, the PHY layer ay transmit a result of the measurement to the MAC layer, and the MAC layer may perform selection/re-selection based on the received result of the measurement or transmit the result to the RRC layer.

Figure 7:
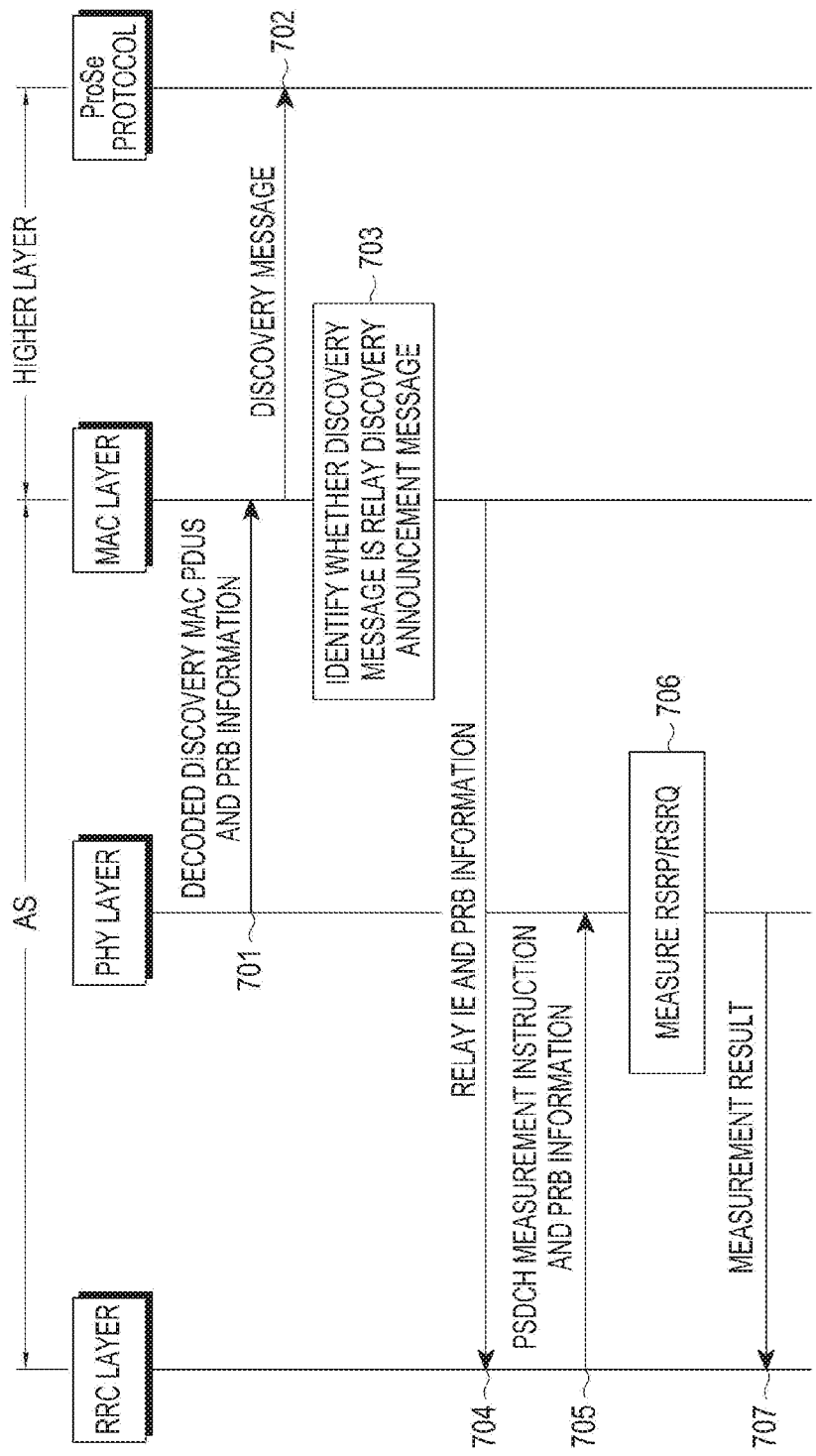
FIG. 7 illustrates a method of measuring D2D link qualities for different UEs according to a fourth embodiment of the present disclosure.

FIG. 7 illustrates a method of measuring D2D link qualities for different UEs according to a fourth embodiment of the present disclosure.

Referring to FIG. 7, a PHY layer decodes discovery PHY PDUs through discovery resources and transmits discovery resource information to a MAC layer along with the decoded discovery MAC PDUs (PHY PDUs without CRC) in step 701.

The PHY layer transmits information on the discovery resources on which discovery PHY PDUs have been successfully decoded for one of the following discovery resources to the MAC layer.

First, discovery PHY PDUs received on discovery resources within all discovery RX resource pools Second, discovery PHY PDUs received on discovery resources within all PS discovery RX resource pools Third, discovery PHY PDUs received on discovery resources within all relay UE discovery RX resource pools The MAC layer transmits the discovery message received from the PHY layer to a ProSe protocol in step 702, Further, the MAC layer determines whether the received discovery message is a relay UE message (an announcement, request, or response message) based on fields within the received discovery message in step 703. The ProSe protocol transmits a relay ID and discovery resource information received through the discovery message to the RRC layer in step 704 when the discovery message is the relay UE discovery message, and ignores the discovery message when the discovery message is not the relay UE discovery message. At this time, other measurement-related information received through the discovery message is also transmitted to the RRC layer.

According to an embodiment, the discovery message may be a measurement-related discovery message, and the discovery message is transmitted by the relay UE. When receiving the discovery MAC PDU, the MAC layer checks whether there is the discovery message. The MAC layer informs the RRC layer of a measurement result and other information received through the discovery message when the discovery message exists, and transmits the discovery message to the ProSe protocol when the discovery message does not exist.

The RRC layer instructs the PHY layer to measure the PSDCH in step 705. At this time, the RRC layer provides the discovery resource information received from the ProSe protocol to the PHY layer.

The PHY layer performs the measurement based on the discovery resource information received from the RRC layer in step 706, and provides a result of the measurement to the RRC layer or the MAC layer in step 707. In a method of measuring the discovery resource information by the PHY layer, the PHY may measure the discovery resource information (that is, PRBs) instructed by the RRC layer at every discovery period or determine PRBs within the next discovery period based on a predetermined pattern and measure the determined PRBs. At this time, the PRBs instructed by the RRC may be for the previous period.

According to an embodiment, the MAC layer may directly transmit the measurement instruction directly to the PHY layer instead of transmitting the measurement instruction to the PHY via the RRC layer. Then, after performing the measurement according to the measurement instruction, the PHY layer may transmit the measurement result to the MAC layer and the MAC layer may perform selection/re-selection based on the measurement result or transmit the result to the RRC layer.

Further, according to the fourth embodiment of the present disclosure, the protocol stack for discovery message transmission may be changed, which is the same as the description in the second embodiment.

Figure 8:
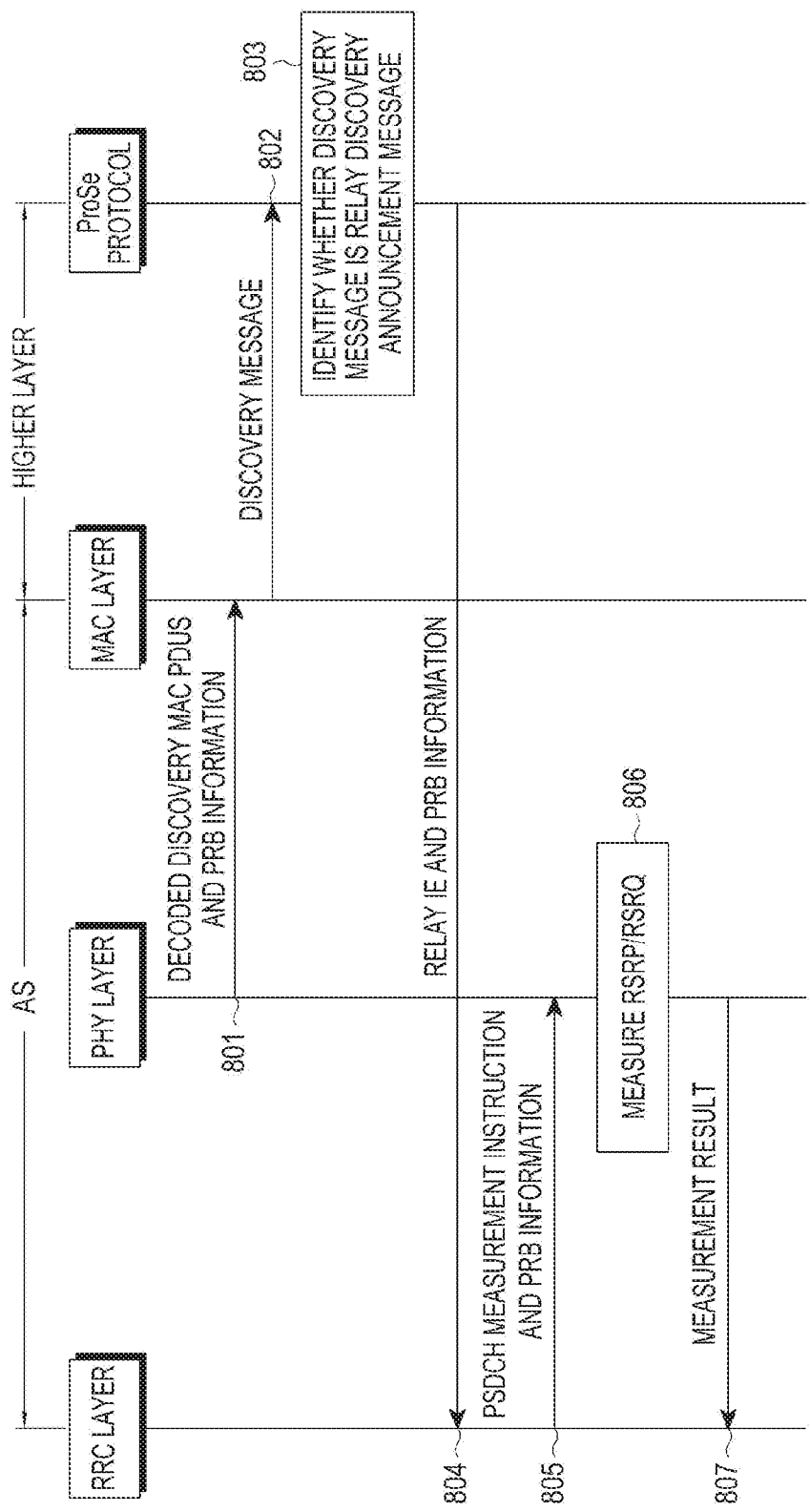
FIG. 8 illustrates a method of measuring D2D link qualities for different UEs according to a fifth embodiment of the present disclosure.

FIG. 8 illustrates a method of measuring D2D link qualities for different UEs according to a fifth embodiment of the present disclosure.

Referring to FIG. 8, a PHY layer decodes discovery PHY PDUs through discovery resources and transmits the decoded discovery MAC PDUs (PHY PDUs without CRC) to an MAC layer in step 801. The MAC layer transmits the discovery message received from the PHY layer to a ProSe protocol in step 802.

The ProSe protocol determines whether the discovery message received from the MAC layer is a relay UE discovery message (an announcement, request, or response message) in step 803. The ProSe protocol transmits a relay ID received through the discovery message and discovery resource information included in the discovery message to the RRC layer in step 804 when the discovery message is the relay UE discovery message, and ignores the discovery information when the discovery message is not the relay UE discovery message. At this time, other measurement-related information received through the discovery message is also transmitted to the RRC layer. Further, the ProSe protocol may identify whether the UE is interested in the corresponding relay based on higher layer parameters. The ProSe protocol may transmit the relay ID and the discovery resource information received through the discovery message to the RRC layer only when the UE is interested in the corresponding relay, and, otherwise, may ignore the relay ID and the discovery resource information without transmitting them.

The RRC layer instructs the PHY layer to measure the PSDCH in step 805. At this time, the RRC layer provides the discovery resource information received from the ProSe protocol to the PHY layer.

The PHY layer performs the measurement based on the discovery resource information received from the RRC layer in step 806, and provides a result of the measurement to the RRC layer or the MAC layer in step 807. In a method of measuring the discovery resource information by the PHY layer, the PHY may measure the discovery resource information (that is, PRBs) instructed by the RRC layer at every discovery period or determine PRBs within the next discovery period based on a predetermined pattern and measure the determined PRBs. At this time, the PRBs instructed by the RRC may be for the previous period. Further, the PRBs may correspond to only the next discovery period.

Figure 9:
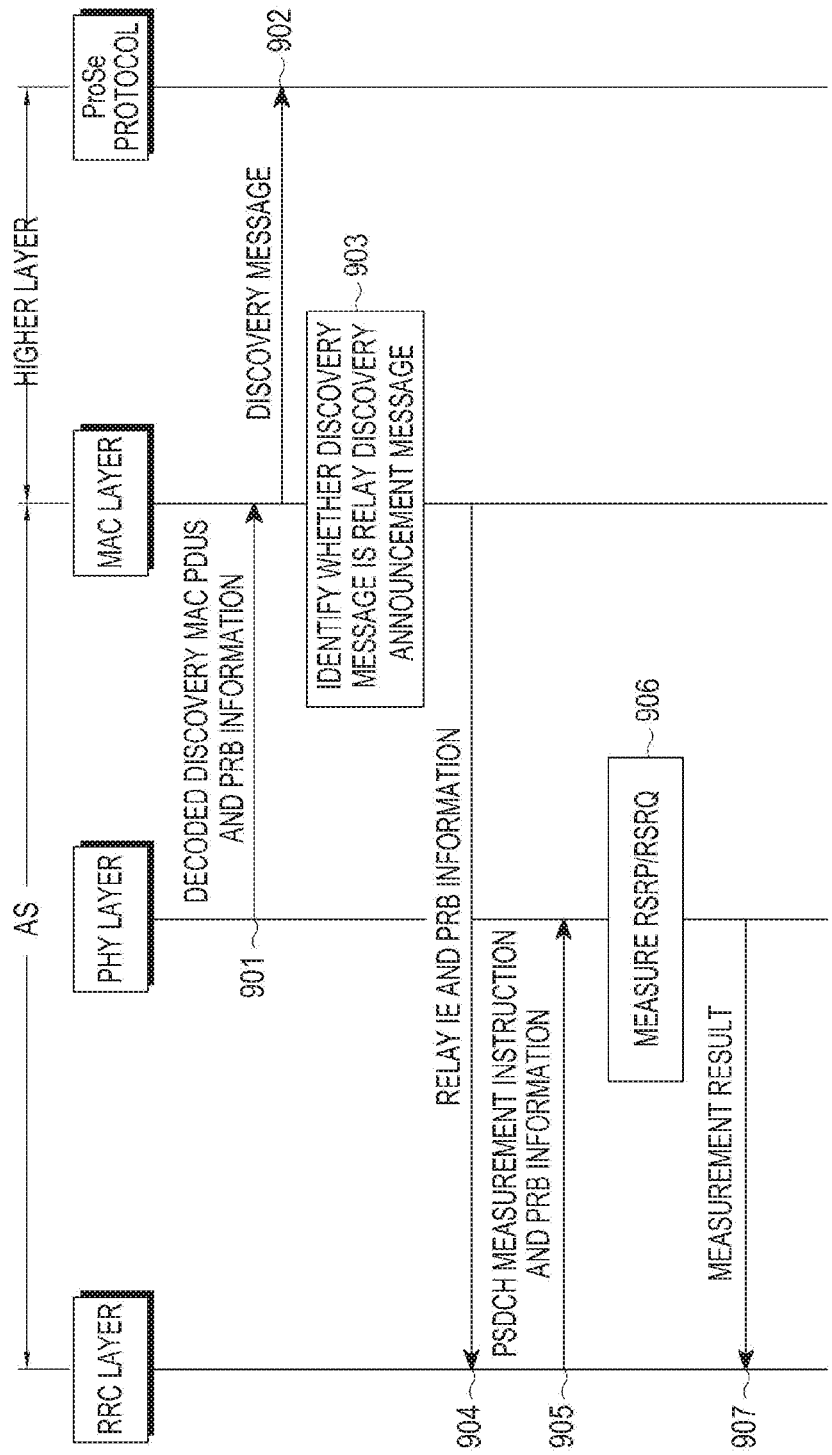
FIG. 9 illustrates a method of measuring D2D link qualities for different UEs according to a sixth embodiment of the present disclosure.

FIG. 9 illustrates a method of measuring D2D link qualities for different UEs according to a sixth embodiment of the present disclosure.

Referring to FIG. 9, a PHY layer decodes discovery PHY PDUs through discovery resources and transmits the decoded discovery MAC PDUs to an MAC layer in step 901. The MAC layer determines whether the received discovery message is a relay UE discovery message (an announcement, request, or response message) in step 903. The MAC layer transmits a relay ID received through the discovery message and discovery resource information included in the discovery message to the RRC layer in step 904 when the discovery message is the relay UE discovery message, and ignores the discovery message when the discovery message is not the relay UE discovery message. At this time, other measurement-related information received through the discovery message is also transmitted to the RRC layer.

According to an embodiment, the discovery message may be a measurement-related discovery message, and the discovery message is transmitted by the relay UE, receiving the discovery MAC PDU, the MAC layer checks whether there is the discovery message. The MAC layer informs the RRC layer of a measurement result and other information received through the discovery message when the discovery message exists, and transmits the discovery message to the ProSe protocol when the discovery message does not exist.

The RRC layer instructs the PHY layer to measure the PSDCH in step 905. At this time, the RRC layer provides the discovery resource information received from the ProSe protocol to the PHY layer.

The PHY layer performs the measurement based on the discovery resource information received from the RRC layer in step 906, and provides a result of the measurement to the RRC layer or the MAC layer in step 907. In a method of measuring the discovery resource information by the PHY layer, the PHY may measure the discovery resource information (that is, PRBs) instructed by the RRC layer at every discovery period or determine PRBs within the next discovery period based on a predetermined pattern and measure the determined PRBs. At this time, the PRBs instructed by the RRC may be for the previous period. Further, the PRBs may correspond to only the next discovery period.

According to an embodiment, the ProSe protocol may transmit the relay UE ID and the discovery resource information received through the discovery message to the MAC layer. Then, the MAC layer may instruct the PHY layer to perform the measurement, and the MAC layer may perform the measurement and transmit a result of the measurement to the MAC layer. Thereafter, the MAC layer may perform selection/re-selection based on the measurement result or transmit the result to the RRC layer.

Figure 10:
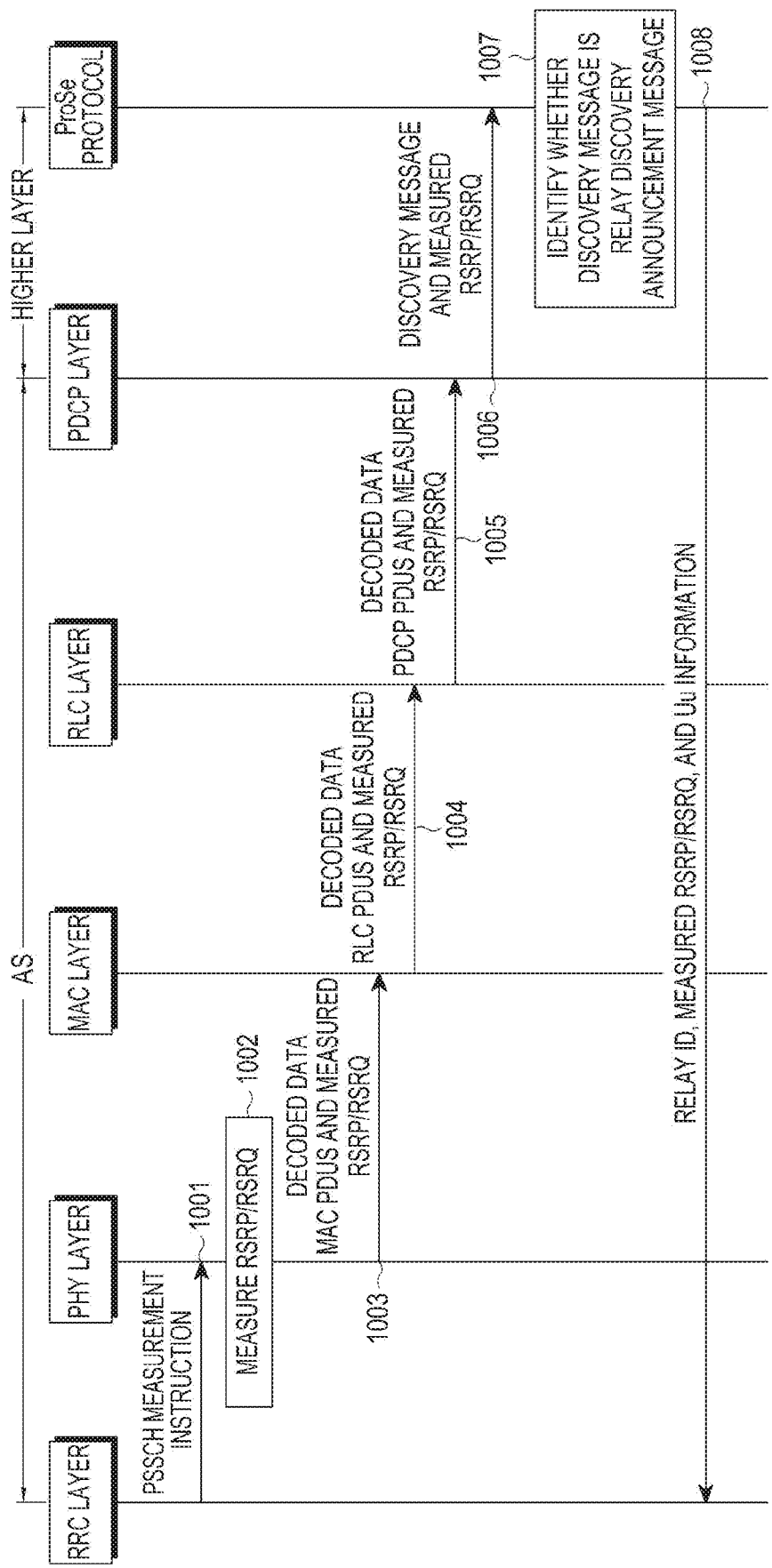
FIG. 10 illustrates a method of measuring D2D link qualities for different UEs according to a seventh embodiment of the present disclosure.

Further, according to the sixth embodiment of the present disclosure, the protocol stack for discovery message transmission may be changed, which is the same as the description in the second embodiment, FIG. 10 illustrates a method of measuring D2D link qualities for different UEs according to a seventh embodiment of the present disclosure.

According to the seventh embodiment of the present disclosure, the PSSCH is used for measuring the link quality instead of using the PSDCH. Using the PSSCH to measure the link quality involves passing through the whole layer 2 stack. Data resources by which data is scheduled (instructed by an SA) are known to receiver nodes. The SA involves an L1 ID of interest.

Referring to FIG. 10, the RRC layer provides a PSSCH measurement instruction to the PHY layer in step 1001, and the PHY layer measures RSRP or RSRQ for each PSSCH resource by which the data instructed by the SA is scheduled in step 1002. Further, the PHY layer transmits the RSRP/RSRQ measured for the data resources corresponding to the successfully decoded data PDUs to the MAC layer along with the decoded MAC PDUs in step 1003. The MAC layer decodes the received MAC PDUs to be RLC PDUs and transmits the decoded RLC PDUs to an RLC layer along with the measured RSRP/RSRQ in step 1004. The RLC layer decodes the received RLC PDUs to be PDCP PDUs and transmits the decoded PDCP PDUs to a PDCP layer along with the measured RSRP/RSRQ in step 1005. The PDCP layer decodes the received PDCP PDUs to be the discovery message and transmits the decoded discovery message and the RSRP/RSRQ value to a ProSe protocol in step 1006. The ProSe protocol determines whether the received discovery message is a relay UE discovery message (an announcement, request, or response message) in step 1007. The ProSe protocol transmits a relay ID and the measured RSRP/RSRQ received through the discovery message to the RRC layer in step 1008 when the discovery message is the relay UE discovery message, and does not transmit the corresponding message to the RRC layer when the discovery message is not the relay UE discovery message. When transmitting the relay identifier and the measurement result to the RRC layer, the ProSe protocol may also transmit other measurement-related information received through the discovery message to the RRC layer. Further, according to an embodiment, the ProSe protocol may identify whether the UE having performed the measurement is interested in the corresponding relay based on higher layer parameters. The ProSe protocol may transmit the relay identifier and the measurement result received through the discovery message to the RRC layer only when the UE is interested in the corresponding relay, and, otherwise, does not transmit them.

In the aforementioned first to seventh embodiments of the present disclosure, the data resources instructed by the SA may be used instead of the discovery resources.

Meanwhile, in the current system, when the remaining D2D grant(s) valid for a scheduling control (SC) period can accept all pending data (in a buffer) which can be used for transmission, all triggered D2D buffer state reports (BSR) should be cancelled. A procedure of cancelling the D2D BSRs considers future data transmissions to which the grants are allocated but which have not yet happened. According to such a scheme, when some data reaches the buffer before the last transmission within the SC period, the buffer state is not empty at the moment when the data reaches the buffer, so that the D2D BSRs are not triggered until a re-transmission timer expires, which delays the D2D BSR triggering.

Accordingly, in order to overcome the problems, the present disclosure proposes the following D2D BSR triggering method.

When there is no pending data which can be used for transmission, all triggered D2D BSRs should be cancelled. At this time, grants for future transmission are not considered. Alternatively, when there is no pending data which can be used for transmission after the last transmission within the corresponding SC period, all triggered D2D BSRs should be cancelled. At this time, a cancel procedure is performed after the last transmission within the corresponding SC period. Alternatively, since all pending data which can be used in the buffer for transmission of the remaining D2D grant(s) for the corresponding SC period can be accepted, if the triggered D2D BSRs are cancelled before the corresponding SC period, the D2D BSRs are triggered within the SC period and the data reaches the buffer after the D2D BSRs are cancelled.

Further, in the current system, all D2D BSRs transmitted during a transmission time interval (TTI) always reflect the buffer state after all MAC PDUs are constructed during the TTI. In such a scheme, when the D2D BSRs are transmitted before the last data transmission within the SC period, the D2D BSRs may report data for which the grant has been already received and, as a result, the eNB may allocate resources larger than required, which nay result in wasting resources.

Accordingly, the present disclosure proposes the following D2D BSR triggering method to overcome the problems.

The D2D BSR transmitted in the TTI reflects the buffer state in consideration of all MAC PDUs constructed during the corresponding TTI and also MAC PDUs that can be constructed using the remaining D2D grant(s) valid during the corresponding SC period in which the D2D BSRs are transmitted. Alternatively, the D2D BSRs are transmitted after the last data transmission within the SC period. Alternatively, when receiving the D2D BSRs from the UE, the eNB calculates a buffer size in the HE based on equation (1) below.

Buffer size=size of buffer received from UE in
D2D-BSR remaining grants available within
SC period in D2D grants allocated to UE after
TTI in which D2D BSRs are received    (1)

Figure 11:
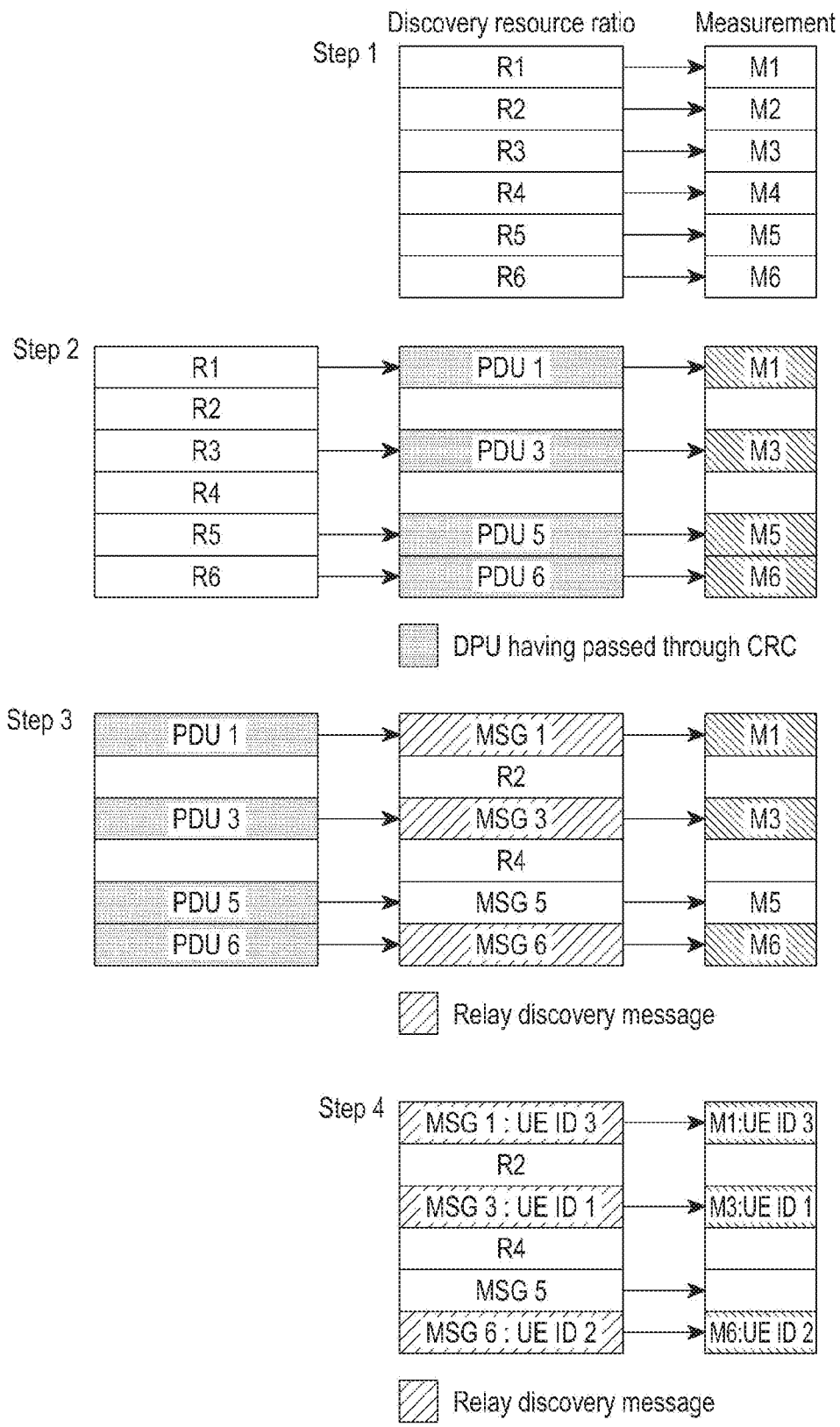
FIGS. 11 and 12 schematically illustrate a method of measuring a D2D link quality for a UE according to an embodiment of the present disclosure.

FIG. 11 schematically illustrates a D2D link quality measurement method for a UE according to the present disclosure. FIG. 11 illustrates an example in which a PHY layer first measures RSRP/RSRQ/RSSI for discovery resources and decodes discovered PDUs in each discovery resource.

Referring to FIG. 11, in step 1, with respect each of discovery resources R1 to R6 within a separated RX pool for discovering a relay (or PS), the PHY layer measures RSRP/RSRQ/RSSI for discovery resources that carry DMRSs. In step 2, the PHY layer decodes discovered PDUs in each discovery resource and, when the decoding is successful (when passing through the CRC), maintains a measurement result of the corresponding PDUs and filter the measurement result of the same UE ID according to steps 3 to 5. Otherwise, the PHY layer removes or discards the measurement result. FIG. 11 illustrates an example in which PDUs 1, 3, 5, and 6 are successfully decoded and corresponding measurement results M1, 3, 5, and 6 are maintained.

In step 3, the determines whether a discovery message within the decoded discovery PDUs is a relay UE discovery message and, when the discovery message is the relay UE discovery message, maintains the measurement result and proceeds to step 4. Otherwise, the UE removes or discards the measurement result. FIG. 11 illustrates a case where MSG 1, 3, and 6 are discovery messages and, accordingly, corresponding measurement results M1, 3, and 6 are maintained.

In step 4, the UE determines a UE ID of the relay UE having transmitted the corresponding discovery message. At this time, the measurement result corresponding to the discovery message is a measurement result for a link with the relay UE identified by the determined UE ID.

Figure 12:
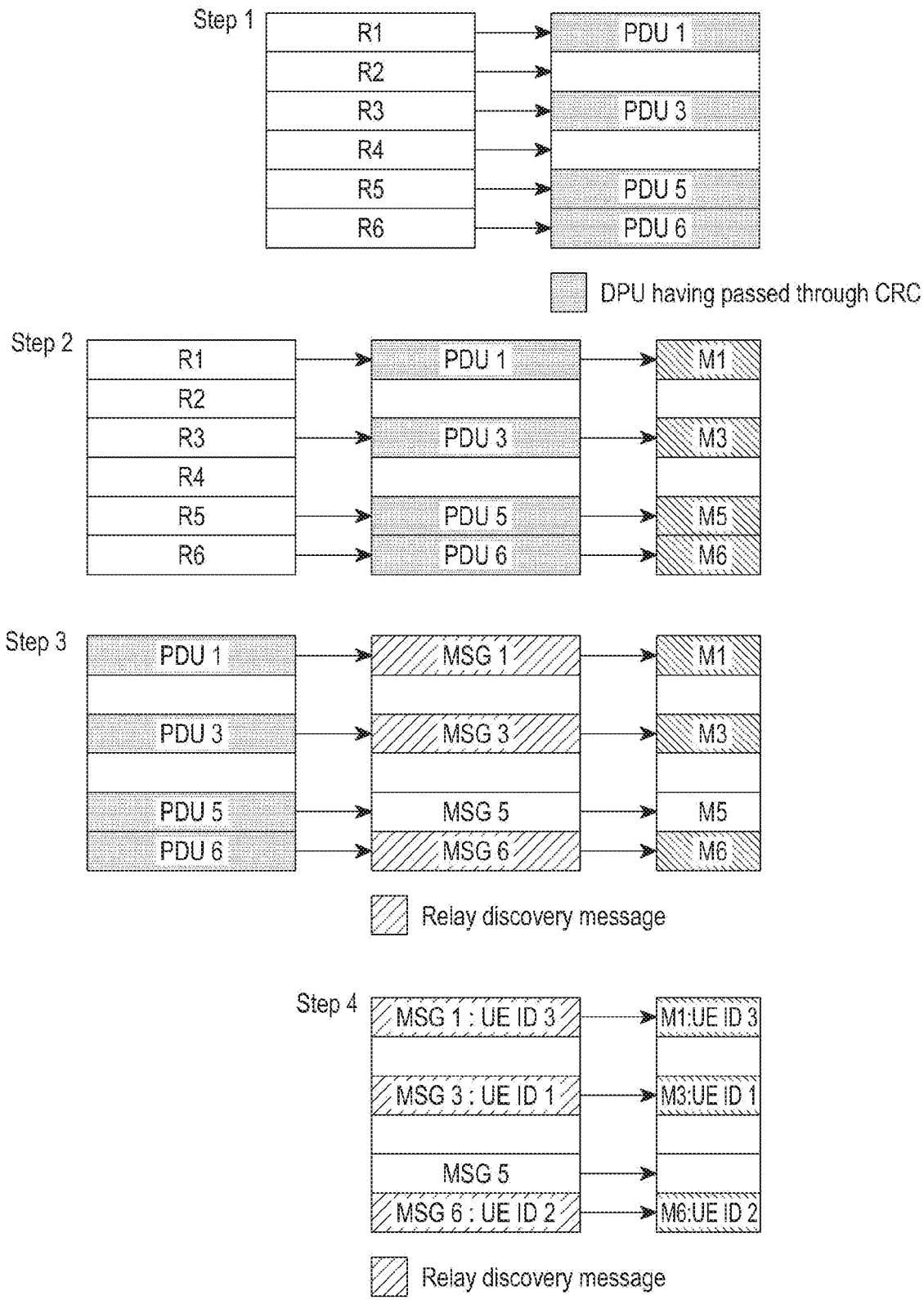

In step 5, the UE filters RSRP/RSRQ/RSSI for the measurement results of the same UE FIG. 12 schematically illustrates another D2D link quality measurement method for a UE according to the present disclosure. FIG. 12 illustrates an example in which the PHY layer measures RSRP/RSRQ/RSSI for discovery resources after decoding discovered PDUs in each discovery resource.

Referring to FIG. 12, in step 1, the PHY layer monitors discovery resources included in one or more discovery RX pools and decodes the discovered PDUs in each discovery resource of the discovery RX pool. The PHY layer monitors each of discovery resources R1 to R6 within a separated RX pool for discovering the relay (or PS) and decodes the discovered PDUs in each discovery resource of the discovery RX pool. FIG. 12 illustrates a case where PDUs 1, 3, 5, and 6 are discovered and decoded in R1, 3, 5 and 6, respectively.

In step 2, the PITY layer measures RSRP/RSRQ/RSSI for resource elements that carry DMRSs in discovery resources corresponding to the successfully decoded. PDUs (having passed through the CRS). Further, according to steps 3 to 5, filtering is performed on the measurement result of the same UE ID. FIG. 12 illustrates a case in which RSRP/RSRQ/RSSI for PDUs 1, 3, 5 and 6 are measured (M1, 3, 5, and 6).

In step 3, the UE determines whether a discovery message within the decoded discovery PDUs is a relay UE discovery message and, when the discovery message is the relay UE discovery message, maintains the measurement result and proceeds to step 4. Otherwise, the UE removes or discards the measurement result. FIG. 12 illustrates a case where MSG 1, 3, and 6 are discovery messages and, accordingly, corresponding measurement results M1, 3, and 6 are maintained.

In step 4, the UE determines a UE ID of the relay UE having transmitted the corresponding discovery message. At this time, the measurement result corresponding to the discovery message is a measurement result for a link with the relay UE identified by the determined UE ID.

In step 5, the UE filters RSRP/RSRQ/RSSI for the measurement results of the same UE ID.

In another method of selecting/re-selecting the relay UE, an AS layer may transmit each of the received discovery messages to a higher layer (that is, ProSe protocol) along with a corresponding PC5 link quality measurement value. The ProSe protocol analyzes each relay UE discovery message received by a lower layer, generates a final candidate list of the relay UEs that meet a reference of the higher layer, and performs a moving average (PC5 signal strength filtering) to avoid a sudden wireless change for the relay UEs in the final candidate list. The ProSe protocol ranks relay UEs having a signal strength higher than a (pre)set threshold value in a descending order of the signal strength and selects a best relay UE. The ProSe protocol accesses the corresponding relay UE by using PC5 signaling protocol messages. According to an embodiment, the ranking may be performed only when two or more relay UEs exist.

In another method of selecting/re-selecting the relay UE, the ProSe protocol analyzes each relay UE discovery message received by the lower layer, generates the final candidate list that meets the reference of the higher layer, provides the generated final candidate list to the AS, and then receives a selected relay UE from the AS. Further, the ProSe protocol accesses the selected relay UE by using PC5 signaling protocol messages. The AS layer performs moving average (PC5 signal strength filtering) to avoid a sudden wireless change for the relay UEs in the final candidate list received from the ProSe protocol, and ranks the relay UEs having a signal strength higher than a (pre)set threshold value in a descending order of the signal strength and selects a best relay UE. According to an embodiment, the ranking may be performed only when two or more relay UEs exist. The AS informs the higher layer (ProSe protocol) of the selected relay UE.

Figure 13:
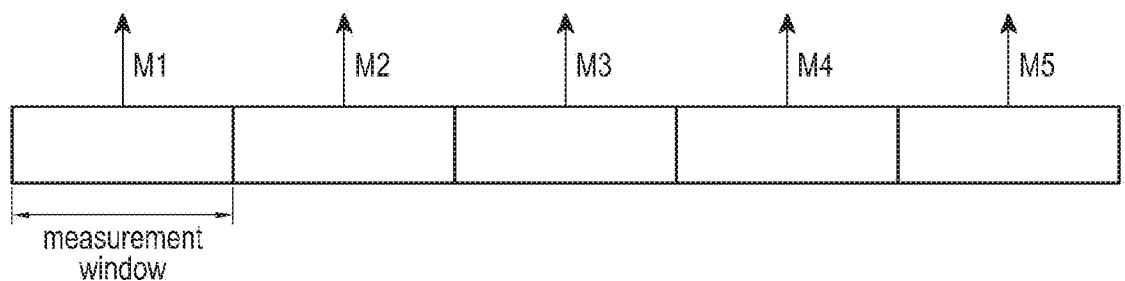
FIG. 13 illustrates an example of measurement according to measurement window.

Meanwhile, the UE identifies the measurement corresponding to the relay ID and then filters measurement values corresponding to the same relay ID. However, due to collision, the discovery PDUs may not be successfully received within predetermined discovery periods and, particularly, a measurement result for a particular relay ID may be not periodically received. For example, as illustrated in FIG. 13, when measurement values M1 to M5 should be received according to a predetermined measurement window, if the measurement values M2, M3, and M4 are not received, an average of M1 and M5 provides an inaccurate result. According to the present disclosure, in this case, when the last measurement result corresponds to a measurement window x and a new measurement result corresponds to a measurement window Y, if Y−X>threshold value, the UE processes the new measurement value corresponding to the measurement window Y as an initial measurement value and ignores or discards previous measurement values of the measurement window X. The threshold value may be pre-defined or preset by the network. Further, instead of measurement window numbering, a system time which is measured by the AS or corresponds to a time at which the measurement is received may be used.

According to another embodiment, when the measurement value is not received in the measurement window X, a measurement value of a measurement window X−1 may be used as the measurement value of the measurement window X. Such a method may be applied only when the measurement is not omitted in N successive measurement windows. N may be pre-defined or preset by the network.

According to another embodiment, in order to avoid omission and collision of the measurement result, the relay UE may always make a request for relay UE discovery resources to a serving eNB. The serving eNB may allocate resources dedicated for the discovery.

According to the relay UE search/discovery method of FIGS. 2 to 13 described above, the subject that determines whether to perform the search/discovery may be the remote UE or the relay UE and the RSRP/RSRQ/RSSI used for determining whether to perform the search/discovery may be for the link between the remote UE and the relay UE or the link between the relay UE and the network. Further, the drawings and embodiments described above may be individually used or a combination of two or more thereof may be used.

Figure 14:
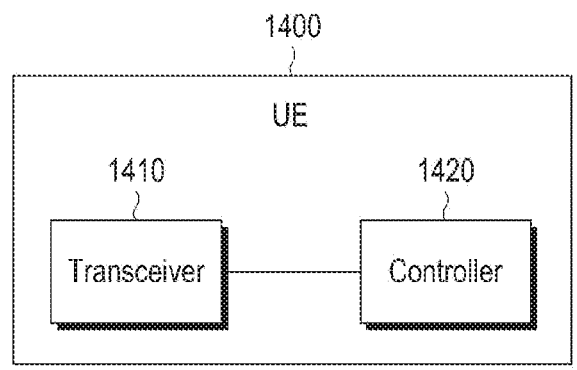
FIG. 14 illustrates a configuration of an apparatus of a UE according to an embodiment of the present disclosure.

FIG. 14 illustrates a configuration of a UE according to an embodiment of the present disclosure. The UE of FIG. 14 may be a remote UE or a relay UE.

A UE 1400 may include a transceiver 1410 for performing data communication with various network nodes and an eNB and a controller 1420 for controlling the transceiver 1410. In the specification, all operations of the remote UE or the relay UE may be construed as being performed by a control of the controller 1420.

Meanwhile, although FIG. 14 illustrates the transceiver 1410 and the controller 1420 as separate elements, the transceiver 1410 and the controller 1420 may be implemented as one element.

The above described operations may be implemented by providing a memory device storing a corresponding program code to the entity of the communication system, the function, the base station, the load manager, or a specific structural element of the terminal. That is, the entity, the function, the load manager, or the controller of the terminal carries out the above described operations by reading and executing the program code stored in the memory device by means of a processor or a CPU.

The entity, the function, the base station, the load manager, various structural elements of the terminal, modules and the like may be operated by using a hardware circuit, e.g, a complementary metal oxide semiconductor based logic circuit, firmware, software, and/or a combination of hardware and the firmware and/or software embedded in a machine readable medium. As an example, various electrical structures and methods may be carried out using electrical circuits such as transistors, logic gates, and application specific integrated circuits (ASICs).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of device to device direct communication, the method comprising:
    receiving, by a user equipment (UE), a plurality of discovery messages on a discovery channel from one or more candidate relay UEs;
    measuring, by a physical layer within the UE, power of reference signals associated with the discovery channel on which each discovery message is received;
    filtering, by a radio resource control (RRC) layer within the UE, power measurements corresponding to a same relay UE ID among power measurements corresponding to the plurality of discovery messages; and
    selecting a relay UE among the one or more candidate relay UEs based on the filtered power measurements.

2. The method of claim 1, wherein at least one of the plurality of discovery messages is a discovery announcement message.

3. The method of claim 1, wherein decoding the plurality of discovery messages for cyclic redundancy check (CRC) is performed by the physical layer within the UE.

4. The method of claim 1, wherein the physical layer generates the power measurements based on a measurement instruction from the RRC layer.

5. The method of claim 1, further comprising:
identifying, from a discovery message of the plurality of discovery messages, a relay UE ID of a candidate relay UE that transmits the discovery message.

6. The method of claim 5, wherein identifying the relay UE ID of the relay UE is performed by a higher layer within the UE, and the identified relay UE ID of the relay UE is transferred by the higher layer to a radio resource control (RRC) layer within the UE.

7. The method of claim 6, wherein the higher layer comprises a medium access control (MAC) layer and a proximity service (ProSe) protocol layer.

8. The method of claim 7, wherein the MAC layer transmits the discovery message and the power measurements to the ProSe protocol layer.

9. The method of claim 1, wherein a proximity service (ProSe) protocol layer determines that one of the plurality of discovery messages is a discovery announcement message.

10. A user equipment (UE) apparatus for device to device direct communication, the UE apparatus comprising:
a transceiver configured to:
 transmit and receive signals for a device to device direct communication; and
a controller comprising a physical layer and a radio resource control (RRC) layer and configured to:
 receive a plurality of discovery messages on a discovery channel from one or more candidate relay UEs,
 measure, by the physical layer, power of reference signals associated with the discovery channel on which each discovery message is received,
 filter, by the RRC layer, power measurements corresponding to a same relay UE ID among power measurements corresponding to the plurality of discovery messages, and
 select a relay UE among the one or more candidate relay UEs based on the filtered power measurements.

11. The UE apparatus of claim 10, wherein at least one of the plurality of discovery messages is a discovery announcement message.

12. The UE apparatus of claim 10,
wherein the physical layer receives and decodes the plurality of discovery messages for cyclic redundancy check (CRC).

13. The UE apparatus of claim 10, wherein the physical layer generates the power measurements based on a measurement instruction from the RRC layer.

14. The UE apparatus of claim 10, wherein the controller is further configured to:
identify, from a discovery message of the plurality of discovery messages, a relay UE ID of a candidate relay UE that transmits the discovery message.

15. The UE apparatus of claim 10, wherein the controller is further configured to include a higher layer, and wherein the higher layer identifies a relay UE ID of the relay UE and transfers the identified relay UE ID of the relay UE to the RRC layer.

16. The UE apparatus of claim 15, wherein the higher layer comprises a medium access control (MAC) layer and a proximity service (ProSe) protocol layer.

17. The UE apparatus of claim 16, wherein the MAC layer transmits the plurality of discovery messages and the power measurements to the ProSe protocol layer.

18. The UE apparatus of claim 10, wherein a proximity service (ProSe) protocol layer determines that one of the plurality of discovery messages is a discovery announcement message.

* * * * *